United States Patent
Lin et al.

(10) Patent No.: US 11,442,687 B2
(45) Date of Patent: Sep. 13, 2022

(54) AUDIO TRANSMISSION DEVICE AND OPERATING SYSTEM UTILIZING THE SAME

(71) Applicant: VIA LABS, INC., New Taipei (TW)

(72) Inventors: Chih-Hsien Lin, New Taipei (TW); Chin-Sung Hsu, New Taipei (TW); Li-Feng Pan, New Taipei (TW)

(73) Assignee: VIA LABS, INC., New Taipei (TW)

( * ) Notice: Subject to any disclaimer, the term of this patent is extended or adjusted under 35 U.S.C. 154(b) by 268 days.

(21) Appl. No.: 16/891,851

(22) Filed: Jun. 3, 2020

(65) Prior Publication Data

US 2021/0026591 A1  Jan. 28, 2021

Related U.S. Application Data

(60) Provisional application No. 62/878,901, filed on Jul. 26, 2019.

(30) Foreign Application Priority Data

Feb. 18, 2020  (TW) ................ 109105068

(51) Int. Cl.
```
G10L 15/20      (2006.01)
G10L 17/00      (2013.01)
H04R 29/00      (2006.01)
G06F 3/16       (2006.01)
G10L 19/00      (2013.01)
```
(52) U.S. Cl.
CPC .............. G06F 3/162 (2013.01); G10L 19/00 (2013.01)

(58) Field of Classification Search
CPC .......... H04R 29/007; H03G 3/32; H03G 3/20; G10L 15/20; G10L 17/00
USPC .............. 381/56, 57, 110; 704/231, 233, 246
See application file for complete search history.

(56) References Cited

U.S. PATENT DOCUMENTS

| | | | |
|---|---|---|---|
| 10,656,676 B2 | 5/2020 | Huang et al. | |
| 2006/0158439 A1* | 7/2006 | Luo ................ | H04N 7/147 345/173 |
| 2013/0272518 A1 | 10/2013 | Wu et al. | |
| 2016/0063997 A1* | 3/2016 | Nemala ............ | G10L 25/06 704/233 |
| 2018/0288609 A1* | 10/2018 | Yamaya ............ | H04W 4/02 |

(Continued)

FOREIGN PATENT DOCUMENTS

| | | |
|---|---|---|
| CN | 103377654 A | 10/2013 |
| TW | 201913402 A | 4/2019 |

*Primary Examiner* — George C Monikang
(74) *Attorney, Agent, or Firm* — McClure, Qualey & Rodack, LLP

(57) ABSTRACT

An audio transmission device coupled to an electronic device and including a detection circuit, a vendor-defined class circuit, and an audio class circuit is provided. The detection circuit detects an external sound to generate an input voice. The vendor-defined class circuit provides a first voice signal to the electronic device according to the input voice. An audio processing application program of the electronic device processes the first voice signal to generate a processed voice to the vendor-defined class circuit. The audio class circuit receives the processed voice from the vendor-defined class circuit, uses the processed voice as a second voice signal, and provides the second voice signal to the media manager of the electronic device.

20 Claims, 5 Drawing Sheets

(56) References Cited

U.S. PATENT DOCUMENTS

2018/0367506 A1  12/2018  Ford et al.
2019/0222560 A1   7/2019  Ford et al.

* cited by examiner

AUDIO TRANSMISSION DEVICE AND OPERATING SYSTEM UTILIZING THE SAME

CROSS REFERENCE TO RELATED APPLICATIONS

This application claims the benefit of U.S. Provisional Application No. 62/878,901 filed on Jul. 26, 2019, and Taiwan Patent Application No. 109105068, filed on Feb. 18, 2020, which are hereby incorporated by reference in their entirety.

BACKGROUND OF THE INVENTION

Field of the Invention

The invention relates to an audio transmission device, and more particularly to an audio transmission device that has a vendor-defined class and an audio class.

Description of the Related Art

Pickup apparatuses generally use a microphone to detect sound and then use a digital signal processor to process the sound detected by the microphone. However, digital signal processors are expensive.

BRIEF SUMMARY OF THE INVENTION

In accordance with an embodiment of the disclosure, an audio transmission device is coupled to an electronic device and includes a detection circuit, a vendor-defined class circuit, and an audio class circuit. The detection circuit detects an external sound to generate an input voice. The vendor-defined class circuit provides a first voice signal to the electronic device according to the input voice. An audio processing application program of the electronic device processes the first voice signal to generate a processed voice to the vendor-defined class circuit. The audio class circuit receives the processed voice from the vendor-defined class circuit, uses the processed voice as a second voice signal, and provides the second voice signal to the media manager of the electronic device.

In accordance with another embodiment of the disclosure, an operating system includes an electronic device and an audio transmission device. The electronic device includes an audio processing application program, a native application program, and a media manager. The media manager is configured to provide a voice signal to the native application program. The audio transmission device is configured to couple to the electronic device and includes a detection circuit, a vendor-defined class circuit, and an audio class circuit. The detection circuit detects an external sound to generate an input voice. The vendor-defined class circuit provides a first voice signal to the audio processing application program according to the input voice. The audio processing application program processes the first voice signal to generate a processed voice to the vendor-defined class circuit. The audio class circuit receives the processed voice provided by the vendor-defined class circuit, uses the processed voice as a second voice signal, and provides the second voice signal to the media manager.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
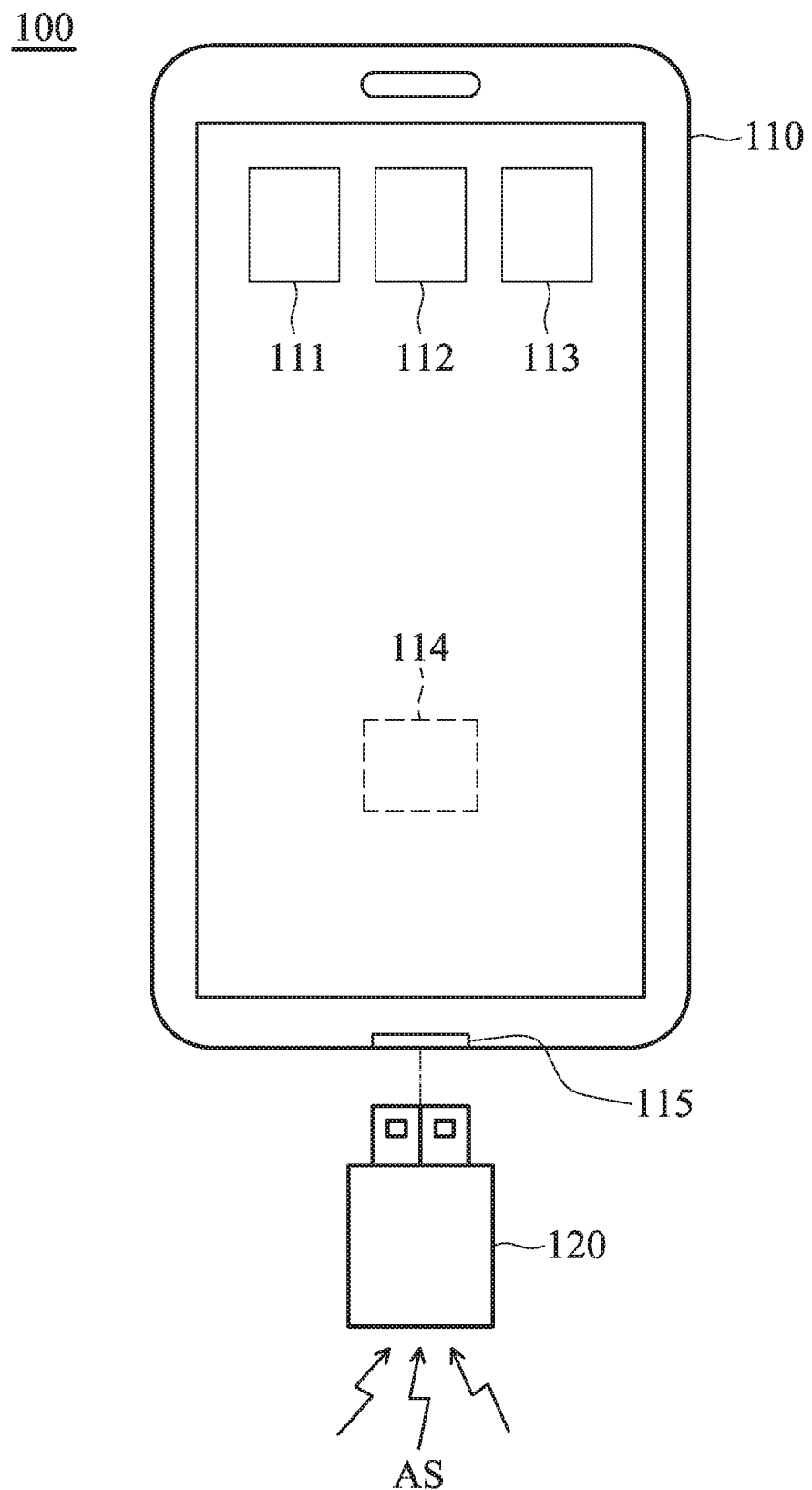
FIG. 1 is a schematic diagram of an exemplary embodiment of an operating system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system, according to various aspects of the present disclosure. The operating system 100 includes an electronic device 110 and an audio transmission device 120. The electronic device 110 is coupled to the audio transmission device 120 and operates according to an external sound AS. The type of electronic device 110 is not limited in the present disclosure. Any electronic device can serve as the electronic device 110, as long as the electronic device includes a CPU. In this embodiment, the electronic device 110 is a smart phone. In this case, the electronic device 110 operates in the Android operating system or the iOS operating system.

The electronic device 110 at least includes an audio processing application program 111, a native application programs 112 and 113, a media manager 114 and a transmission interface 115. In other embodiments, the electronic device 110 includes other hardware elements, such as CPUs, micro-processors, micro-controllers, memories, etc. For the purposes of brevity, FIG. 1 only shows the features related to the present disclosure. In other embodiments, the electronic device 110 is a computer apparatus.

The audio processing application program 111 includes a noise reduction application program, a voice recognition application program, and/or a sound direction recognition application program, but the disclosure is not limited thereto. The audio processing application program 111 is used to process and calculate the received signal to generate a processed voice signal and/or a control signal and selectively provide the processed voice signal and/or the control signal to the audio transmission device 120. For example, the noise reduction application program has a noise reduction function to filter the noise in a voice signal and generate a clean voice signal. The voice recognition application program has the function to recognize the identity of the speaker. In one embodiment, the voice recognition application program transforms a voice signal into a sound map and recognizes the identity of the speaker. The sound direction recognition application program has a function that recognizes the speaker's direction. The sound direction recognition application program determines the direction of the sound source of a voice signal according to the received voice signal. The sound direction recognition application program is capable of selectively providing at least one control signal to the audio transmission device 120 so that a mechanism element rotates and moves toward the direction of the sound source. In this case, the mechanism element operates according to the control signal.

The native application programs 112 and 113 only operate according to the voice signal provided by the media manager 114. The types of the native application programs 112 and 113 are not limited in the present disclosure. In one embodiment, the native application program 112 is a map application program, such as the Google map application program. The Google map application program shows a corresponding map according to a voice signal provided by the media manager 114. In other embodiment, the native application program 113 is a translation application program. The translation application program determines and translates the language spoken by the user, for example, from Chinese to English according to a voice signal provided by the media manager 114. The number of native application programs is not limited in the present disclosure. In some embodiments, the electronic device 110 has more native application programs.

The media manager 114 is used to provide the voice signal to the native application programs 112 and 113. In one embodiment, the media manager 114 is a native media manager. If the electronic device 110 operates in the Android operating system, the media manager 114 is an Android native media manager. In other embodiments, the media manager 114 receives external voices via a driver (not shown). In this case, the driver is a Android driver.

The transmission interface 115 is configured to couple to the audio transmission device 120. The type of transmission interface 115 is not limited in the present disclosure. In one embodiment, the transmission interface 115 includes a USB connector. In this case, the USB connector is a type-C connector. In another embodiment, if the electronic device 120 operates in the iOS operating system, the transmission interface 115 is a Lightning connector. In other embodiments, the transmission interface 115 is a wireless transceiver which utilizes a wireless method to receive an external signal (such as data and/or power) or output a signal (such as data and/or power).

The audio transmission device 120 is configured to detect the external sound AS and provides a voice signal to the electronic device 110. In this embodiment, the audio transmission device 120 first packages the external sound AS into a sound signal which has a vendor-defined class format and is referred to as a first voice signal. Then, the audio transmission device 120 provides the first voice signal to the electronic device 110 via the transmission interface 115. The audio processing application program 111 of the electronic device 110 processes and calculates the received first voice signal to generate a processed first voice signal and/or a control signal. In one embodiment, the electronic device 110 provides the processed first voice signal and/or the control signal to the audio transmission device 120. For example, the audio processing application program 111 of the electronic device 110 is a noise reduction application program which processes the first voice signal to filter the noise in the first voice signal and returns a clean voice signal to the audio transmission device 120.

In one embodiment, the first voice signal has voice components in four channels. In this case, the noise reduction application program, such as the audio processing application program 111, finds the source channel with the main voice component from the first voice signal and filters out the voice components (i.e., noise) in the other channels. The noise reduction application program provides the main voice component in the source channel to the audio transmission device 120.

After receiving the voice component whose noise is reduced, the audio transmission device 120 transmits the noise-reduced voice component provided by the noise reduction application program to the media manager 114 via a specific device which may be an audio class circuit and is recognized by the media manager 114. Next, the media manager 114 provides the clean voice signal to the native application program 112 and/or 113. Therefore, the operation of the native application program 112 and/or 113 does not be affected by environment noise.

In this embodiment, the noise is processed outside of the audio transmission device 120. In other words, the noise is processed in the electronic device 110. Therefore, there is no digital signal processor in the audio transmission device 120, allowing the cost of the elements in the audio transmission device 120 to be reduced. Additionally, even if there is no digital signal processor in the audio transmission device 120, the audio transmission device 120 is capable of providing a voice signal with no environment noise to the electronic device 110. Therefore, the electronic device 110 can determine the meaning of the voice signal normally.

The type of audio transmission device 120 is not limited in the present disclosure. In this embodiment, the audio transmission device 120 is a dongle. In other embodiments, the audio transmission device 120 may be integrated in a charging cable (not shown). Therefore, the electronic device 110 can be charged and receive the voice signal. Additionally, the audio transmission device 120 may include a sound output terminal (not shown). In the embodiment, when the user plugs the earphone into the sound output terminal of the audio transmission device 120, the user can utilize the audio transmission device 120 to listen to the audio (e.g., music) output from the electronic device 110. In other embodiments, the audio transmission device 120 may include at least one mechanism element, such as a rotating axis and/or a roll. In this case, the rotating axis and/or the roll of the audio transmission device 120 rotates and/or moves according to at least one control signal.

Figure 2:
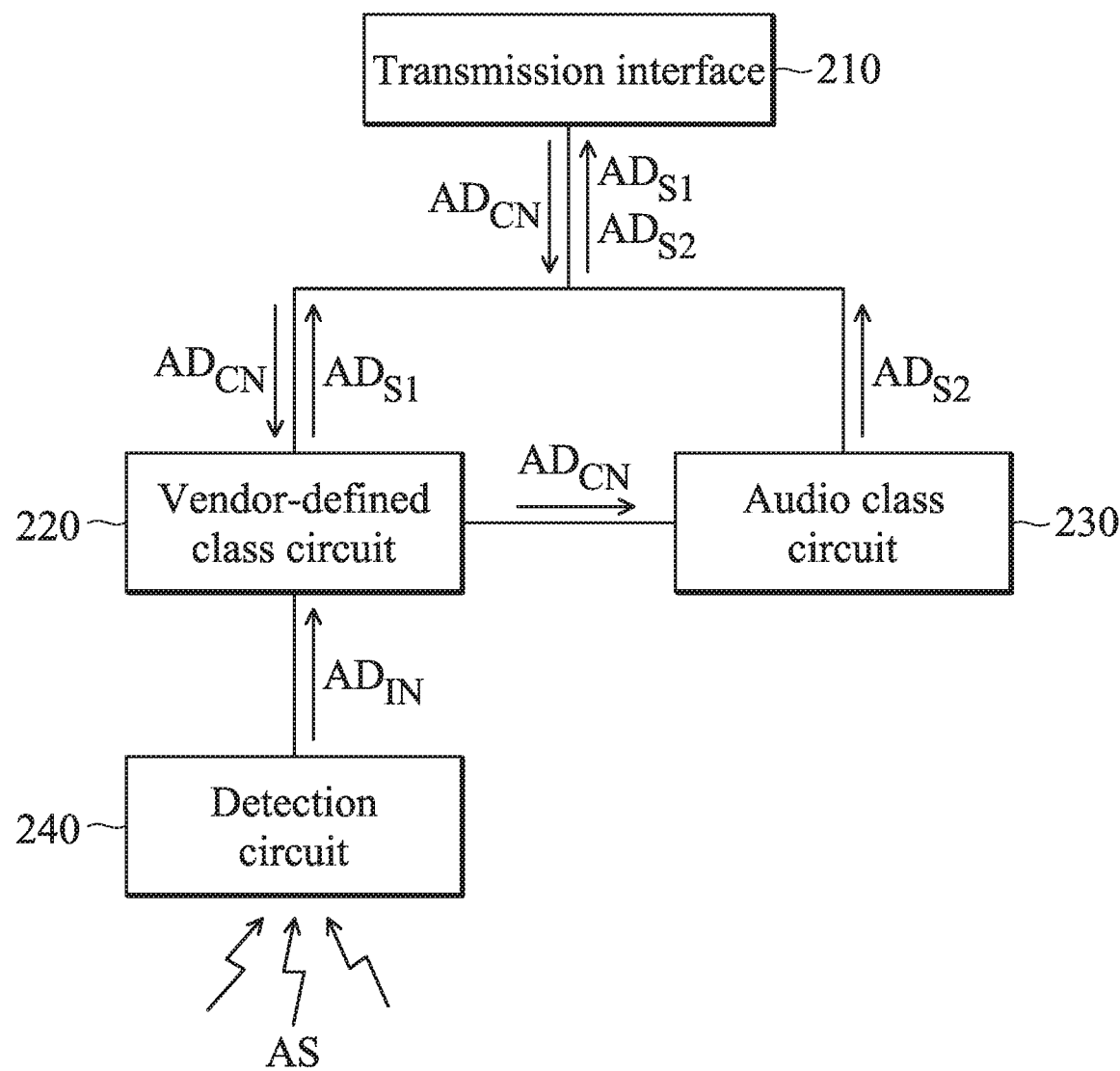
FIG. 2 is a schematic diagram of an exemplary embodiment of an audio transmission device, according to various aspects of the present disclosure.

FIG. 2 is a schematic diagram of an exemplary embodiment of the audio transmission device 120, according to various aspects of the present disclosure. In this embodiment, the audio transmission device 120 includes a transmission interface 210, a vendor-defined class circuit 220, an audio class circuit 230, and a detection circuit 240.

The detection circuit 240 detects the external sound AS to generate an input voice $AD_{IN}$. The structure of the detection circuit 240 is not limited in the present disclosure. The detection circuit 240 includes at least one sound sensor. In one embodiment, the detection circuit 240 is a microphone array. In this case, the microphone array includes four microphones to detect sound in four directions. In other embodiments, the microphone array may include fewer or more microphones.

The vendor-defined class circuit 220 generates a voice signal $AD_{S1}$ according to the input voice $AD_{IN}$. In one embodiment, the vendor-defined class circuit 220 packages the voice signal $AD_{S1}$ into a signal that has a vendor-defined class format. In another embodiment, the vendor-defined class circuit 220 transforms the input voice $AD_{IN}$ into USB format and then provides the transformation result (i.e., the voice signal $AD_{S1}$) to an external electronic device (e.g., 110) via the transmission interface 210. The audio processing application program (e.g., 111) in the external electronic device processes and calculates the voice signal $AD_{S1}$ to generate a processed voice $AD_{CN}$ and returns the processed voice $AD_{CN}$ to the vendor-defined class circuit 220 via the transmission interface 210. For example, the audio processing application program 111 in the electronic device 110 can be a noise reduction application program to filter the noise component in the voice signal $AD_{S1}$ to generate the processed voice $AD_{CN}$ and to return the processed voice $AD_{CN}$ to the vendor-defined class circuit 220 via the transmission interface 210. In one embodiment, the vendor-defined class circuit 220 stores the processed voice $AD_{CN}$. At this time, the processed voice $AD_{CN}$ is a clean voice signal, which has no noise component.

The audio class circuit 230 receives the processed voice $AD_{CN}$ via the vendor-defined class circuit 220, uses the processed voice $AD_{CN}$ as a voice signal $AD_{S2}$, and provides the voice signal $AD_{S2}$ to the media manager (e.g., 114) in the external electronic device. Since the voice signal $AD_{S2}$ is a clean voice signal and no noise is in the voice signal $AD_{S2}$, when the media manager 114 provides the voice signal $AD_{S2}$ to the native application program 112 or 113, the native application program 112 or 113 can recognize the voice signal $AD_{S2}$ and operates according to the voice signal $AD_{S2}$.

For example, assuming that the native application program 112 shows the corresponding texts according to the voice signal $AD_{S2}$. In this case, if there is noise component in the voice signal $AD_{S2}$, the native application program 112 may show the wrong text. However, since the audio class circuit 230 provides a clean voice signal to the media manager 114, the native application program 112 shows the correct texts. The structure of the audio class circuit 230 is not limited in the present disclosure. In one embodiment, the audio class circuit 230 is a USB audio class (UAC) circuit.

The transmission interface 210 is configured to output the voice signal $AD_{S1}$ and the voice signal $AD_{S2}$ and receive the processed voice $AD_{CN}$. The type of transmission interface 210 is not limited in the present disclosure. In this embodiment, the type of transmission interface 210 is the same as the type of transmission interface 115. For example, if the transmission interface 115 is a wireless transceiver, the transmission interface 210 is also a wireless transceiver. In other embodiments, if the transmission interface 115 is a USB connector, the transmission interface 210 is also a USB connector. In one embodiment, the transmission interface 210 uses the pins D+ and D− of the USB connector to transmit the voice signals $AD_{S1}$ and $AD_{S2}$ and the processed voice $AD_{CN}$.

Since the vendor-defined class circuit 220 and the audio class circuit 230 are disposed in the audio transmission device 120, when the audio transmission device 120 is coupled to a computer or a monitoring system, the file manager of the computer or the monitoring system can observe that the audio transmission device 120 has a vendor-defined class and an audio class. In a conventional audio transmission device having a digital signal processor, since only an audio class circuit in the conventional audio transmission device, the conventional audio transmission device just plays and receives sound and does not provide the sound. Therefore, when the conventional audio transmission device is coupled to a computer or a monitoring system, the file manager of the computer or the monitoring system observes that the conventional audio transmission device only has the audio class. However, the audio transmission device 120 of the present disclosure utilizes the vendor-defined class circuit 220 to package the voice signal $AD_{S1}$ into the signal having a vendor-defined class. The audio transmission device 120 provides the signal having the vendor-defined class to an external electronic device (e.g., 110) via the transmission interface 210. Therefore, no digital signal processor or no audio processing circuit is disposed in the audio transmission device 120 to reduce the cost of elements in the audio transmission device 120.

Figure 3:
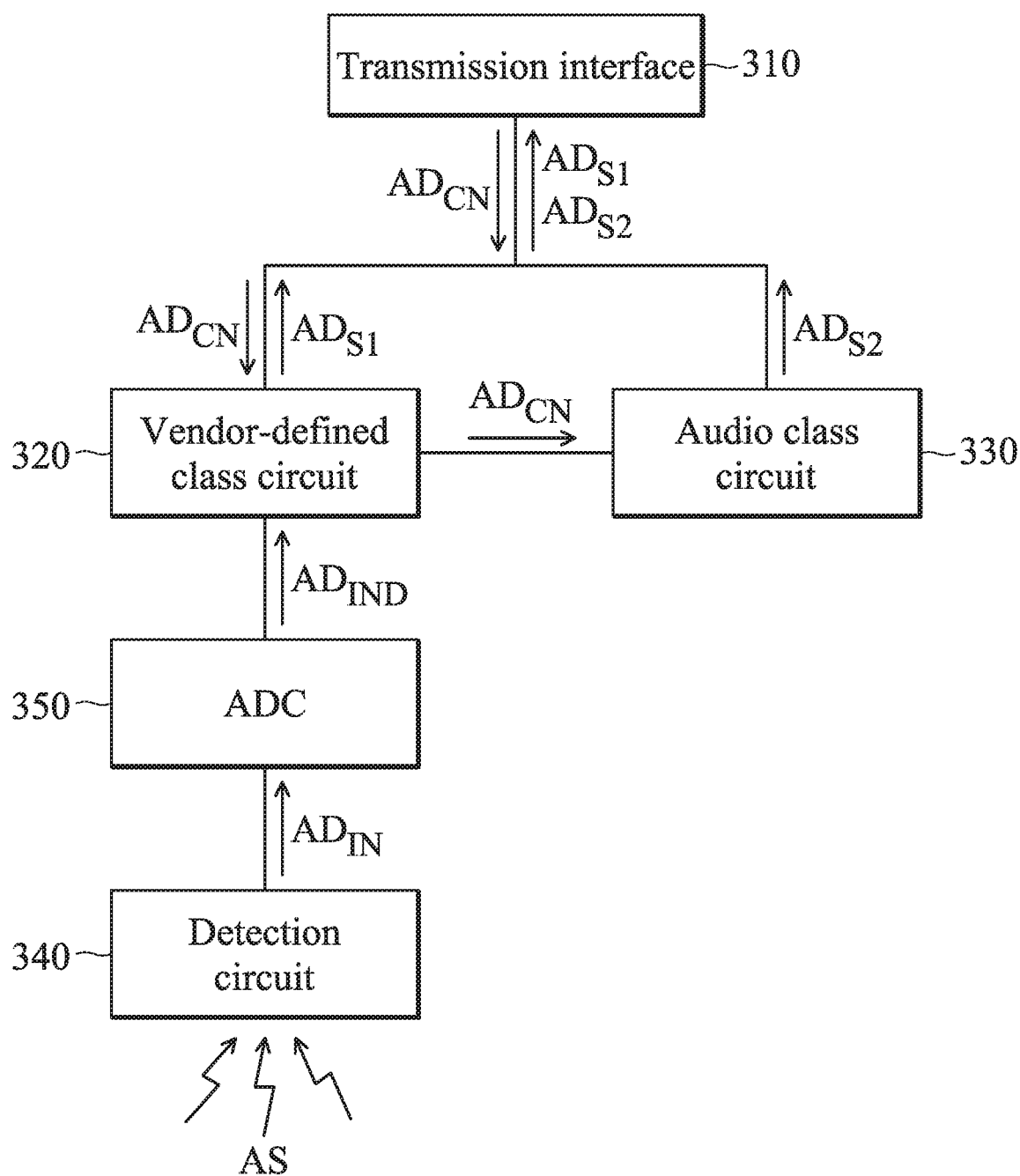
FIG. 3 is a schematic diagram of another exemplary embodiment of the audio transmission device, according to various aspects of the present disclosure.

FIG. 3 is a schematic diagram of another exemplary embodiment of the audio transmission device, according to various aspects of the present disclosure. The audio transmission device 120 includes a transmission interface 310, a vendor-defined class circuit 320, an audio class circuit 330, a detection circuit 340 and an analog-to-digital converter (ADC) 350. Since the features of the transmission interface 310, the vendor-defined class circuit 320, the audio class circuit 330 and the detection circuit 340 are the same as the transmission interface 210, the vendor-defined class circuit 220, the audio class circuit 230 and the detection circuit 240 of FIG. 2, the descriptions of the features of the transmission interface 310, the vendor-defined class circuit 320, the audio class circuit 330 and the detection circuit 340 are omitted.

In the embodiment, the ADC 350 converts the input voice $AD_{IN}$ to generate a digital signal $AD_{IND}$ to the vendor-defined class circuit 320. The vendor-defined class circuit 320 processes the digital signal $AD_{IND}$ to generate a voice signal $AD_{S1}$. In one embodiment, the ADC 350 is integrated into the detection circuit 340 or the vendor-defined class circuit 320.

Figure 4:
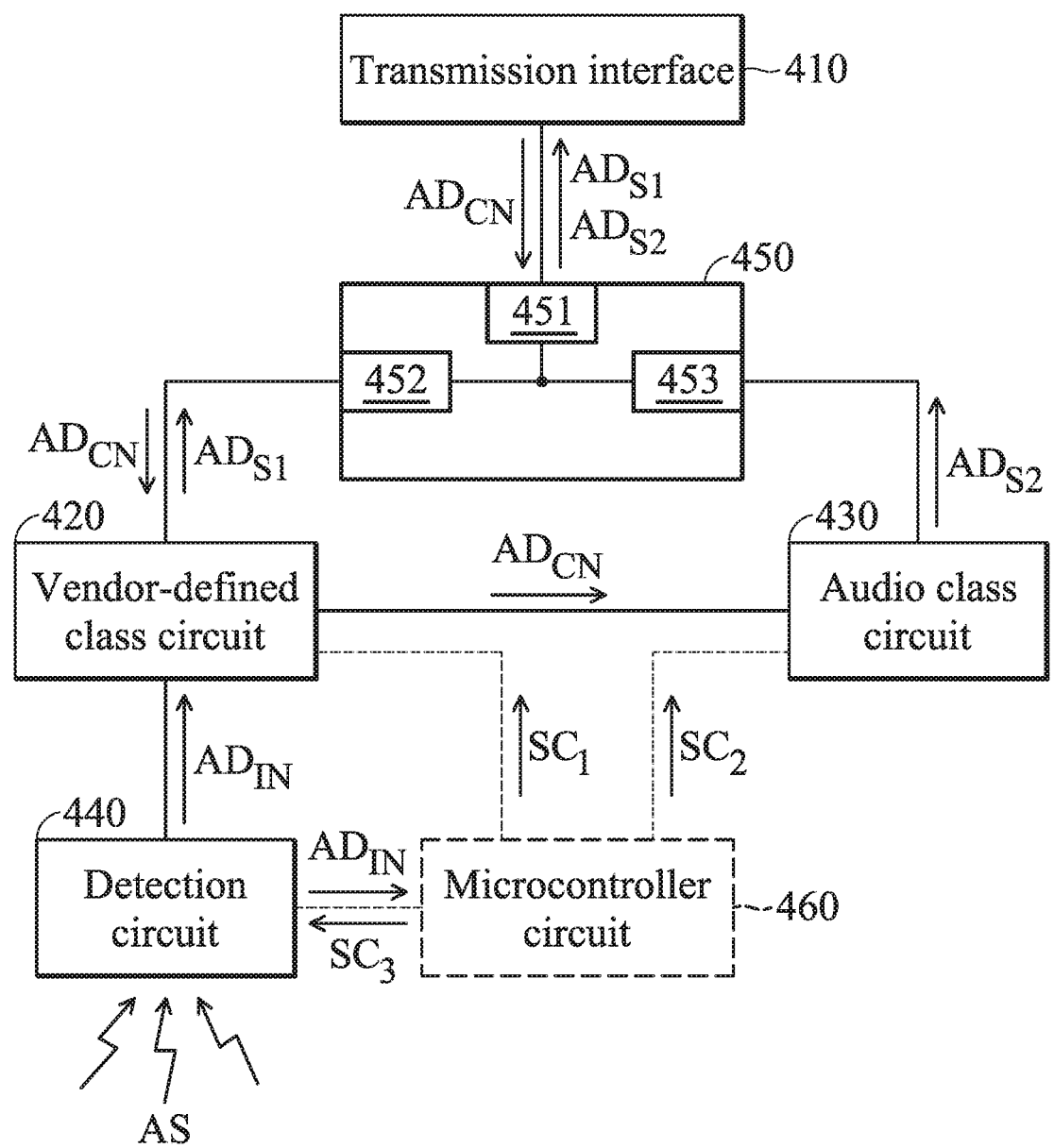
FIG. 4 is a schematic diagram of another exemplary embodiment of the audio transmission device, according to various aspects of the present disclosure.

FIG. 4 is a schematic diagram of another exemplary embodiment of the audio transmission device, according to various aspects of the present disclosure. As shown in FIG. 4, the audio transmission device 120 includes a transmission interface 410, a vendor-defined class circuit 420, an audio class circuit 430, a detection circuit 440 and a hub 450. Since the features of the transmission interface 410, the vendor-defined class circuit 420, the audio class circuit 430 and the detection circuit 440 are the same as the transmission interface 210, the vendor-defined class circuit 220, the audio class circuit 230 and the detection circuit 240 of FIG. 2, the descriptions of the features of the transmission interface 410, the vendor-defined class circuit 420, the audio class circuit 430 and the detection circuit 440 are omitted.

In this embodiment, the hub 450 includes an upstream port 451 and downstream ports 452 and 453. In one embodiment, the hub 450 is a USB hub. The upstream port 451 is configured to provide the voice signals $AD_{S1}$ and $AD_{S2}$ to the transmission interface 410 and to receive the processed voice $AD_{CN}$. The downstream port 452 is coupled to the vendor-defined class circuit 420 to provide the voice signal $AD_{S1}$ to the upstream port 451 and receive the processed voice $AD_{CN}$ from the upstream port 451. The downstream port 453 is coupled to the audio class circuit 430 to provide the voice signal $AD_{S2}$ to the upstream port 451.

In other embodiments, the audio transmission device 120 further includes a microcontroller circuit 460. The microcontroller circuit 460 generates a control signal $SC_1$ to direct the vendor-defined class circuit 420 to output the voice signal $AD_{S1}$ to the downstream port 452. In this case, the vendor-defined class circuit 420 also receives the processed voice $AD_{CN}$ from the downstream port 452 according to the control signal $SC_1$. In another embodiment, the microcontroller circuit 460 further generates a control signal $SC_2$ to direct the audio class circuit 430 to output the voice signal $AD_{S2}$ to the downstream port 453. In this case, the audio class circuit 430 also receives the processed voice $AD_{CN}$ from the vendor-defined class circuit 420 according to the control signal $SC_2$.

In other embodiment, the microcontroller circuit 460 further controls the detection circuit 440. In this case, the microcontroller circuit 460 utilizes a control signal $SC_3$ to direct the detection circuit 440 to provide the input voice $AD_{IN}$. The microcontroller circuit 460 determines whether the intensity of the input voice $AD_{IN}$ is higher than a predetermined value. When the intensity of the input voice $AD_{IN}$ is higher than the predetermined value, it means that the external sound AS is an effective sound. Therefore, the microcontroller circuit 460 utilizes the control signal $SC_3$ to direct the detection circuit 440 to provide the input voice $AD_{IN}$ to the vendor-defined class circuit 420. However, when the intensity of the input voice $AD_{IN}$ is not higher than the predetermined value, it means that the external sound AS is an ineffective sound, such as a noise. Therefore, the microcontroller circuit 460 utilizes the control signal $SC_3$ to direct the detection circuit 440 to stop providing the input voice $AD_{IN}$ to the vendor-defined class circuit 420. In other embodiments, one of the vendor-defined class circuit 420, the audio class circuit 430 and the microcontroller circuit 460 is disposed in the hub 450. In one embodiment, the vendor-defined class circuit 420, the audio class circuit 430 and microcontroller circuit 460 are all disposed in the hub 450.

Figure 5:
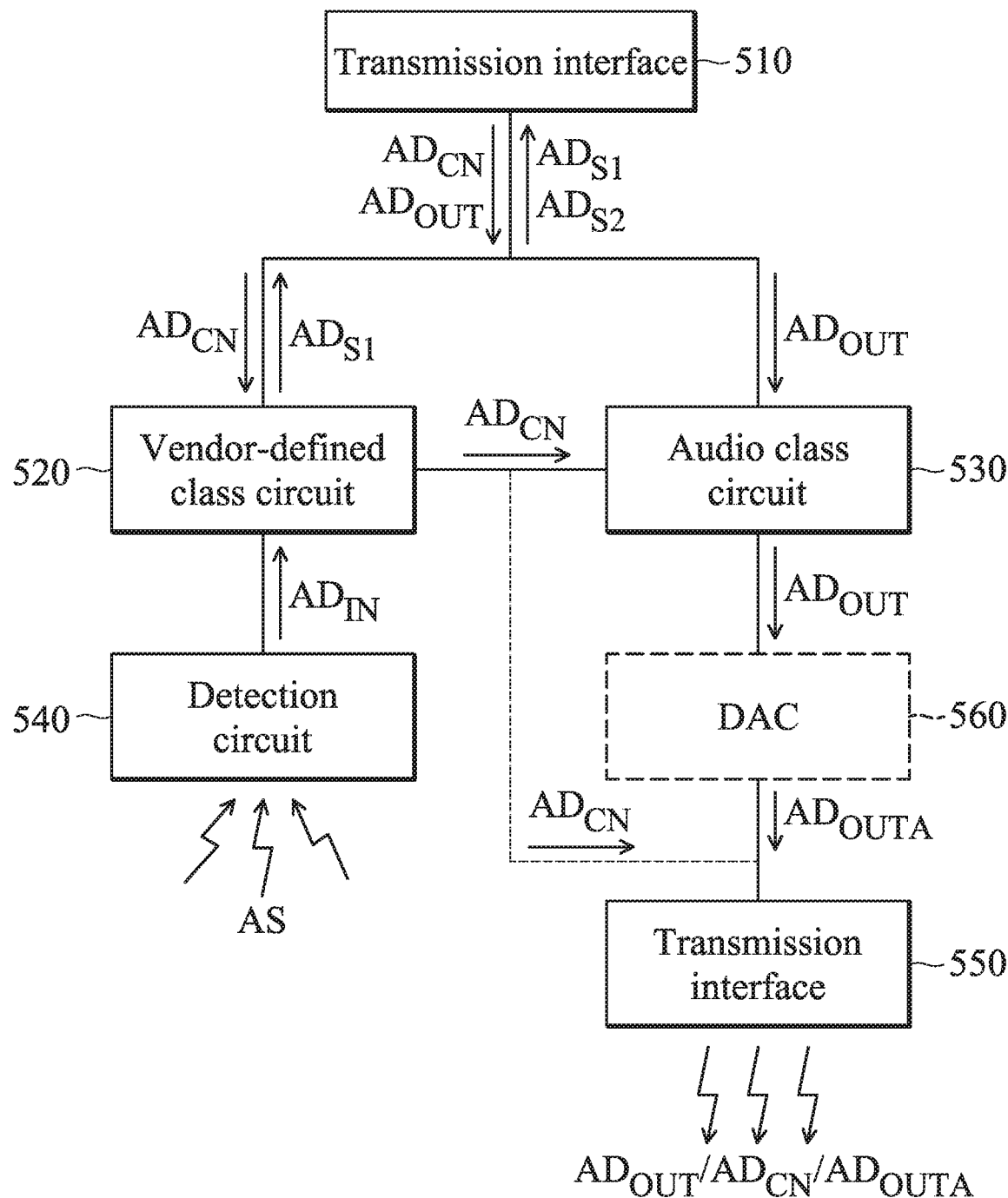
FIG. 5 is a schematic diagram of another exemplary embodiment of the audio transmission device, according to various aspects of the present disclosure.

FIG. 5 is a schematic diagram of another exemplary embodiment of the audio transmission device, according to various aspects of the present disclosure. FIG. 5 is similar to FIG. 2 except for the addition of a transmission interface 550. Since the features of the transmission interface 510, the vender defined class circuit 520, the audio class circuit 530 and the detection circuit 540 are the same as the transmission interface 210, the vender-defined class circuit 220, the audio class circuit 230 and the detection circuit 240 shown in FIG. 2, the descriptions of the features of the transmission interface 510, the vender defined class circuit 520, the audio class circuit 530 and the detection circuit 540 are omitted.

The transmission interface 550 is configured to transmit an output voice $AD_{OUT}$. In one embodiment, the audio class circuit 530 receives the output voice $AD_{OUT}$ from an external electronic device (e.g., 110) via the transmission interface 510 and provides the output voice $AD_{OUT}$ to the transmission interface 550. In another embodiment, the transmission interface 550 transmits the processed voice $AD_{CN}$. In this case, the vender defined class circuit 520 provides the processed voice $AD_{CN}$ to the transmission interface 550.

The circuit structure of the transmission interface 550 is not limited in the present disclosure. In one embodiment, the transmission interface 550 includes a player (e.g., a speaker). The player plays sound according to the output voice $AD_{OUT}$ and/or the processed voice $AD_{CN}$. In another embodiment, the transmission interface 550 transmits the output voice $AD_{OUT}$ and/or processed voice $AD_{CN}$ to an external player (not shown). The present disclosure does not limit how the transmission interface 550 transmits the output voice $AD_{OUT}$ and/or processed voice $AD_{CN}$ to an external player. In one embodiment, the transmission interface 550 is a wireless transceiver configured to send the output voice $AD_{OUT}$ and/or processed voice $AD_{CN}$. In this case, the external player includes a wireless transceiver to receive the output voice $AD_{OUT}$ and/or the processed voice $AD_{CN}$.

In one embodiment, the transmission interface 550 is an earphone socket, such as a 3.5 mm jack. In this case, when an earphone (not shown) plugs the transmission interface 550, the user can use the earphone to listen the output voice $AD_{OUT}$ and/or processed voice $AD_{CN}$ provided by the external electronic device. When the earphone does not plug the transmission interface 550, the external electronic device may directly play the output voice $AD_{OUT}$ and/or processed voice $AD_{CN}$.

In another embodiment, the audio transmission device 120 further includes a digital-to-analog converter (DAC) 560. The DAC 560 is coupled between the audio class circuit 530 and the transmission interface 550 to convert the output voice $AD_{OUT}$ from a digital format into an analog format and provides the output voice (e.g., $AD_{OUTA}$) with the analog format to the transmission interface 550. In other embodiment, the audio transmission device 120 further includes another DAC (not shown) to convert the processed voice $AD_{CN}$ from a digital format into an analog format and provides the converted result to the transmission interface 550.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. An audio transmission device coupled to an electronic device and comprising:
    a first transmission interface configured to connect to the electronic device;
    a detection circuit detecting an external sound to generate an input voice;
    a vendor-defined class circuit generating a first voice signal according to the input voice, providing the first voice signal to the electronic device via the first transmission interface and receiving a processed voice via the first transmission interface, wherein an audio processing application program of the electronic device processes the first voice signal to generate the processed voice to the first transmission interface; and
    an audio class circuit receiving the processed voice from the vendor-defined class circuit, using the processed voice as a second voice signal and providing the second voice signal to a media manager of the electronic device via the first transmission interface,
    wherein:
    the vendor-defined class circuit comprises:
    a first interface providing the first voice signal to the first transmission interface and receiving the processed voice from the first transmission interface; and
    a second interface providing the processed voice to the audio class circuit,
    the first interface is directly connected to the first transmission interface, and the second interface does not connect to the first transmission interface.

2. The audio transmission device as claimed in claim 1, further comprising:
    an analog-to-digital converter converting the input voice to generate a digital signal, wherein the vendor-defined class circuit processes the digital signal to generate the first voice signal.

3. The audio transmission device as claimed in claim 1, further comprising:
a hub comprising:
an upstream port coupled to the first transmission interface to provide the first voice signal to the electronic device and receive the processed voice of the electronic device;
a first downstream port coupled to the vendor-defined class circuit to provide the first voice signal to the upstream port and receiving the processed voice from the upstream port; and
a second downstream port coupled to the audio class circuit to provide the second voice signal to the upstream port.

4. The audio transmission device as claimed in claim 3, wherein the hub is a USB hub.

5. The audio transmission device as claimed in claim 3, further comprising:
a microcontroller circuit configured to direct the vendor-defined class circuit to output the first voice signal to the first downstream port and to direct the audio class circuit to output the second voice signal to the second downstream port.

6. The audio transmission device as claimed in claim 1, further comprising:
a second transmission interface configured to transmit an output voice, wherein the audio class circuit receives the output voice from the electronic device and provides the output voice to the second transmission interface.

7. The audio transmission device as claimed in claim 6, further comprising:
a digital-to-analog converter coupled between the audio class circuit and the second transmission interface to convert the output voice from a digital format into an analog format and to provide the output voice having the analog format to the second transmission interface.

8. The audio transmission device as claimed in claim 1, further comprising:
a second transmission interface configured to transmit the processed voice, wherein the vendor-defined class circuit outputs the processed voice to the second transmission interface.

9. The audio transmission device as claimed in claim 1, further comprising:
a mechanism element operating according to a control signal,
wherein the audio processing application program of the electronic device processes the first voice signal to generate the control signal so that the mechanism element rotates and moves toward a sound source.

10. An operating system comprising:
an electronic device comprising:
an audio processing application program;
a native application program; and
a media manager configured to provide a voice signal to the native application program; and
an audio transmission device configured to couple to the electronic device and comprising:
a first transmission interface configured to connect to the electronic device;
a detection circuit detecting an external sound to generate an input voice;
a vendor-defined class circuit generating a first voice signal according to the input voice, providing the first voice signal to the audio processing application program via the first transmission interface and receiving a processed voice via the first transmission interface, wherein the audio processing application program processes the first voice signal to generate the processed voice and provides the processed voice to the first transmission interface; and
an audio class circuit receiving the processed voice provided by the vendor-defined class circuit, using the processed voice as a second voice signal and providing the second voice signal to the media manager via the first transmission interface,
wherein:
the vendor-defined class circuit comprises:
a first interface providing the first voice signal to the first transmission interface and receiving the processed voice from the first transmission interface; and
a second interface providing the processed voice to the audio class circuit,
the first interface is directly connected to the first transmission interface, and the second interface does not connect to the first transmission interface.

11. The operating system as claimed in claim 10, wherein the audio transmission device further comprises:
an analog-to-digital converter converting the input voice to generate a digital signal to the vendor-defined class circuit, wherein the vendor-defined class circuit processes the digital signal to generate the first voice signal.

12. The operating system as claimed in claim 10, wherein the audio transmission device further comprises:
a hub comprising:
an upstream port coupled to the first transmission interface to provide the first voice signal to the electronic device and receive the processed voice of the electronic device;
a first downstream port coupled to the vendor-defined class circuit to provide the first voice signal to the upstream port and receiving the processed voice from the upstream port; and
a second downstream port coupled to the audio class circuit to provide the second voice signal to the upstream port.

13. The operating system as claimed in claim 12, wherein the audio transmission device further comprises:
a microcontroller circuit configured to direct the vendor-defined class circuit to output the first voice signal to the first downstream port and direct the audio class circuit to output the second voice signal to the second downstream port.

14. The operating system as claimed in claim 10, wherein the audio transmission device further comprises:
a second transmission interface configured to transmit an output voice, wherein the audio class circuit receives the output voice from the electronic device and provides the output voice to the second transmission interface.

15. The operating system as claimed in claim 14, wherein the audio transmission device further comprises:
a digital-to-analog converter coupled between the audio class circuit and the second transmission interface to convert the output voice from a digital format into an analog format and to provide the output voice having the analog format to the second transmission interface.

16. The operating system as claimed in claim 10, wherein the audio transmission device further comprises:

a second transmission interface configured to transmit the processed voice, wherein the vendor-defined class circuit outputs the processed voice to the second transmission interface.

17. The operating system as claimed in claim 10, wherein the audio transmission device further comprises:
a mechanism element operating according to a control signal,
wherein the audio processing application program of the electronic device processes the first voice signal to generate the control signal so that the mechanism element rotates and moves toward the sound source.

18. The operating system as claimed in claim 10, wherein the audio transmission device further comprises:
a USB connection port configured to couple to the electronic device.

19. The operating system as claimed in claim 10, wherein the vendor-defined class circuit and the audio class circuit are integrated into the audio transmission device, and the audio transmission is disposed independent of the electronic device.

20. The operating system as claimed in claim 19, wherein the audio transmission device is a dongle or the audio transmission device is integrated in a cable.

\* \* \* \* \*